United States Patent
Chen (10) Patent No.: US 7,628,364 B2
(45) Date of Patent: Dec. 8, 2009

(54) FIXATION DEVICE

(75) Inventor: Jeong-Shiun Chen, Zhonghe (TW)

(73) Assignee: Supa Technology Co., Ltd., Taipei Hsien (TW)

( * ) Notice: Subject to any disclaimer, the term of this patent is extended or adjusted under 35 U.S.C. 154(b) by 505 days.

(21) Appl. No.: 11/505,345

(22) Filed: Aug. 17, 2006

(65) Prior Publication Data

US 2008/0061199 A1    Mar. 13, 2008

(51) Int. Cl.
*E04G 3/00* (2006.01)
*A45D 42/14* (2006.01)
(52) U.S. Cl. .................................. 248/278.1; 248/363
(58) Field of Classification Search .............. 248/274.1, 248/278.1, 284.1, 205, 5, 206, 2, 8, 363
See application file for complete search history.

(56) References Cited

U.S. PATENT DOCUMENTS

2007/0120026 A1*  5/2007  Chen ....................... 248/205.5

* cited by examiner

*Primary Examiner*—J. Allen Shriver, II
*Assistant Examiner*—Erin Smith
(74) *Attorney, Agent, or Firm*—Birch, Stewart, Kolasch & Birch, LLP (57) ABSTRACT

A fixation device includes a base assembly including a suction disk and a base; a horizontal rotating assembly pivoted to the base assembly and rotating pivotally along a central axis of the base assembly; a first angle adjusting assembly pivoted to the horizontal rotating assembly and rotating pivotally along an axis perpendicular to the central axis of the base assembly; and a second angle adjusting assembly pivoted to the first angle adjusting assembly and rotating pivotally along an axis perpendicular to the rotation axis of the first angle adjusting assembly. The suction disk includes a disk arm extending upward and the base has a supporting column extending upward. The supporting column and disk arm pivotally joint with a locking tab. By flicking the locking tab, the suction disk is capable of sucking on and disengaging from a plane surface.

6 Claims, 13 Drawing Sheets

FIXATION DEVICE

BACKGROUND OF THE INVENTION

1. Field of the Invention

The present invention relates generally to a fixation device, particularly relates to a fixation device for communication equipments that is able to suck on a plane surface and adjust the horizontal angle, the vertical angle and the axial height. Thus, the communication equipments are placed in the most appropriate direction, height and angle.

2. The Prior Arts

The recent communication equipments such as mobile phones, PDAs and GPS provide convenient communicating functions. Users may use the communication equipments anytime and anywhere. However, how to dispose the communication equipments when the users are taking the conveyance or using another tools at the same time is a big problem. Although the conventional fixation device for the communication equipments provides the function for fixing the communication equipments on the conveyance, but due to the frame of the communication equipments are fixed, the users may not do any adjustment on the fixation device. Therefore, the conventional fixation device is inconvenient to operate which is against the ergonomics and the habit.

SUMMARY OF THE INVENTION

A primary objective of the present invention is to provide a fixation device for the communication equipments, which is able to suck on a plane surface and adjust the horizontal angle, the vertical angle and the axial height. Therefore, the communication equipments are placed on the fixation device with the most appropriate direction, height and angle.

According to the primary objective described above, the present invention provides a fixation device comprising a base assembly, a horizontal rotating assembly pivoted to the base assembly, a first angle adjusting assembly pivoted to the horizontal rotating assembly and a second angle adjusting assembly pivoted to the first angle adjusting assembly. The base assembly includes a suction disk, a locking tab and a base. The suction disk includes a disk arm. The disk arm is disposed at the center thereof, telescoped into a base spring and then the base from the bottom of the base, and pivotally jointed to the locking tab by a positioning pin. The suction disk is sucked on the plane surface when the locking tab is in a first position, and the suction disk disengages from the plane surface when the locking tab is in a second position. In addition, the base has a base cap with a first toothed portion arranged in horizontal and circular on the top surface thereof. The horizontal rotating assembly is pivoted to the top of the base by a connecting bar and a connecting screw and rotates horizontally. The horizontal rotating assembly includes at least one elastic piece for engaging with the first toothed portion. The horizontal rotating assembly is fixed in place by the engagement between the elastic pieces and the first toothed portion when the horizontal rotating assembly rotates relative to the base assembly. The horizontal rotating assembly further includes two stop members respectively disposed at two opposite sides thereof and moved vertically. A first elastic member is telescoped fit on each stop member. When the stop members move, the first elastic members are deformed. When the stop members are released, the first elastic members push them back to their initial position. The first angle adjusting assembly is pivoted to the horizontal rotating assembly and rotates pivotally along an axis perpendicular to a central axis of the base assembly. Part of the first angle adjusting assembly is a cylindrical structure and the cylindrical axis is the rotation axis of the first angle adjusting assembly. The first angle adjusting assembly includes a second toothed portion arranged at the bottom surface thereof and engaged with the stop members when the first angle adjusting assembly connects with the horizontal rotating assembly. A second angle adjusting assembly is pivoted to the first angle adjusting assembly and rotates pivotally along an axis perpendicular to the rotation axis of the first angle adjusting assembly. The second angle adjusting assembly comprises a third toothed portion and connects to the first angle adjusting assembly by a second screw, a second elastic member and a positioning member. The second angle adjusting assembly is fixed in place when the positioning member engages with the third toothed portion. The second angle adjusting assembly is rotatable when the positioning member disengages from the third toothed portion.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
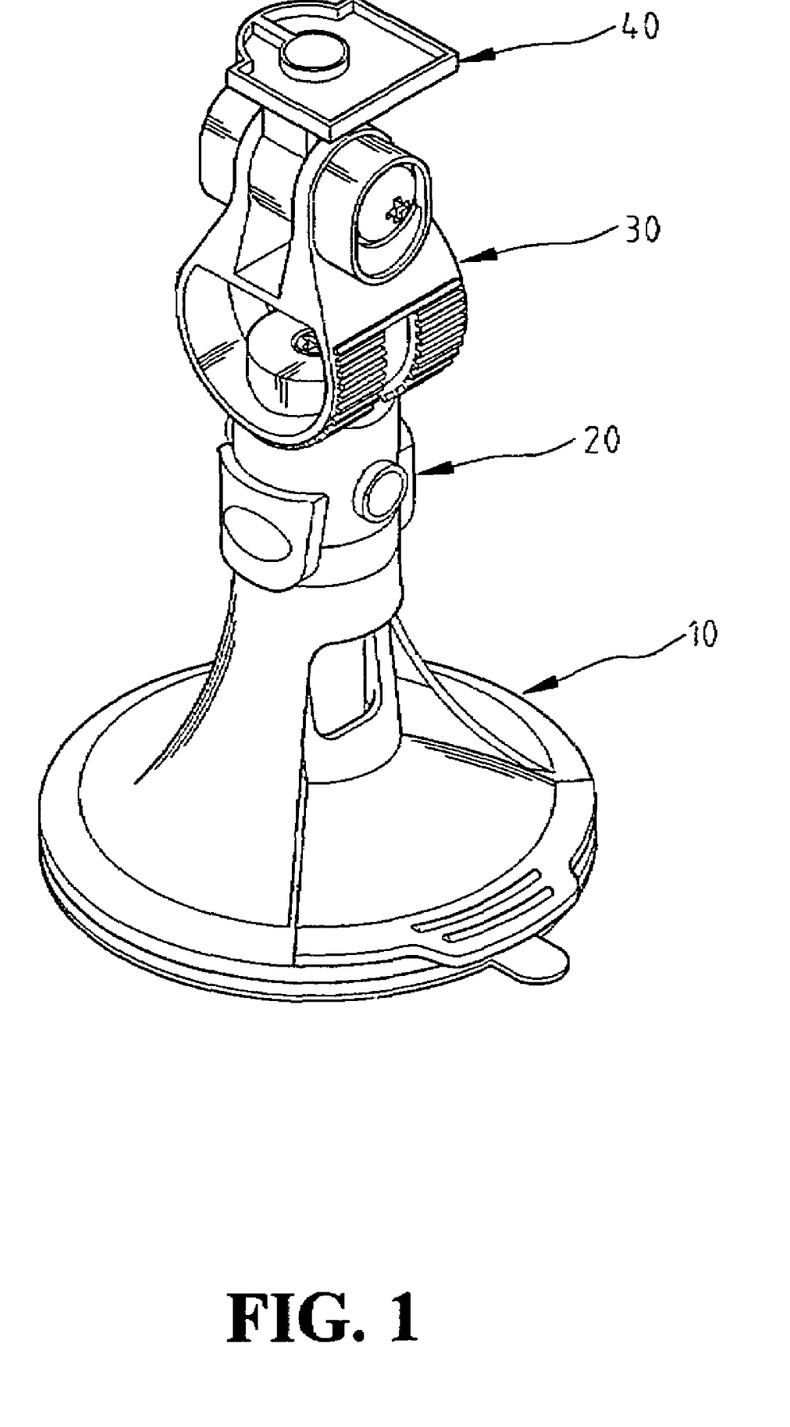
FIG. 1 is an assembly view showing a fixation device in accordance with the present invention.

Referring to FIG. 1, a fixation device in accordance with an embodiment of the present invention comprises a base assembly 10, a horizontal rotating assembly 20 pivoted to the base assembly 10 and rotating along an central axis of the base assembly 10, a first angle adjusting assembly 30 pivoted to the horizontal rotating assembly 20 and rotating pivotally along an axis perpendicular to the axis of the base assembly 10 and a second angle adjusting assembly 40 pivoted to the first angle adjusting assembly 30 and rotated pivotally along an axis perpendicular to the rotation axis of the first angle adjusting assembly 30.

Figure 2:
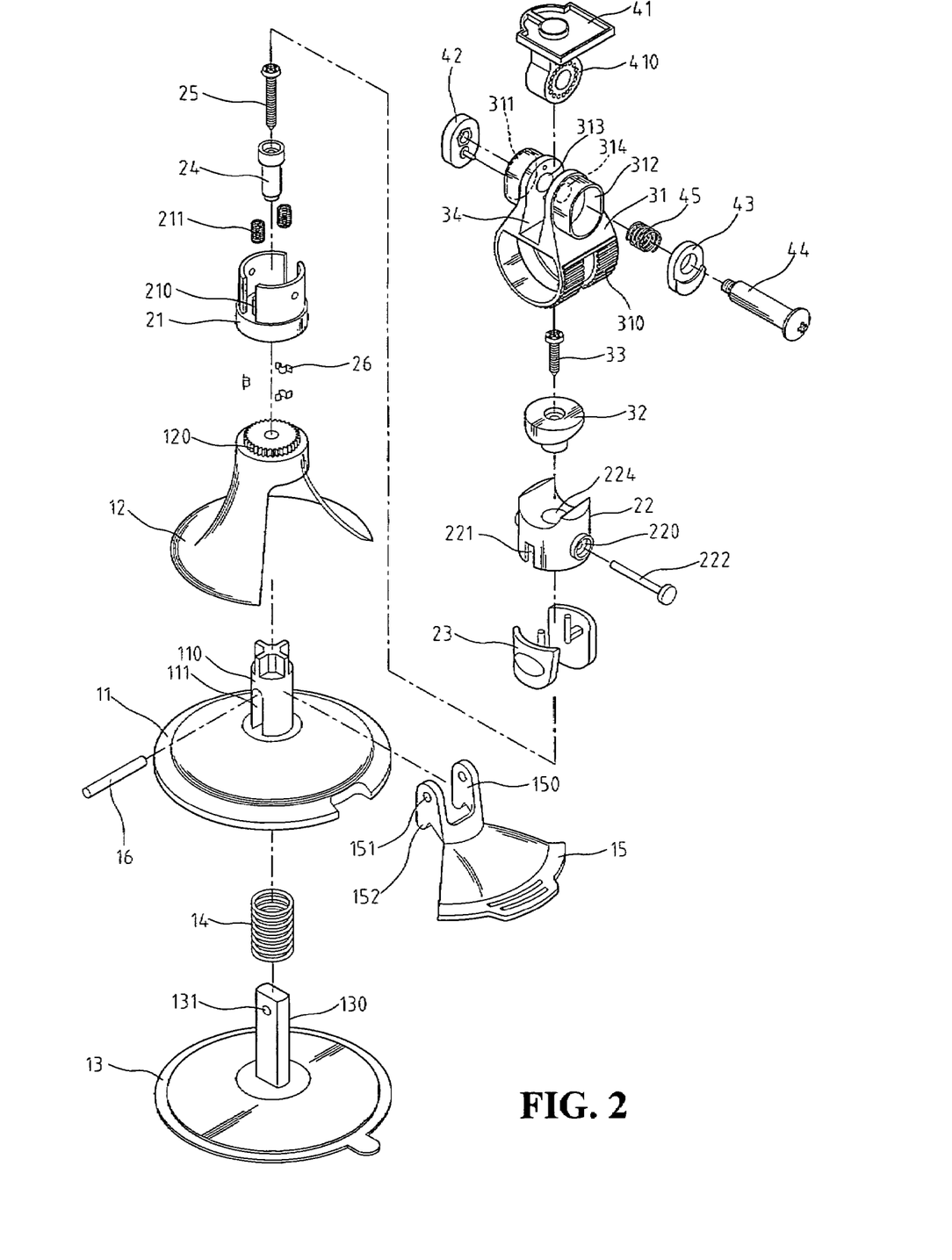
FIG. 2 is an exploded view of the fixation device in accordance with the present invention.
Figure 3:
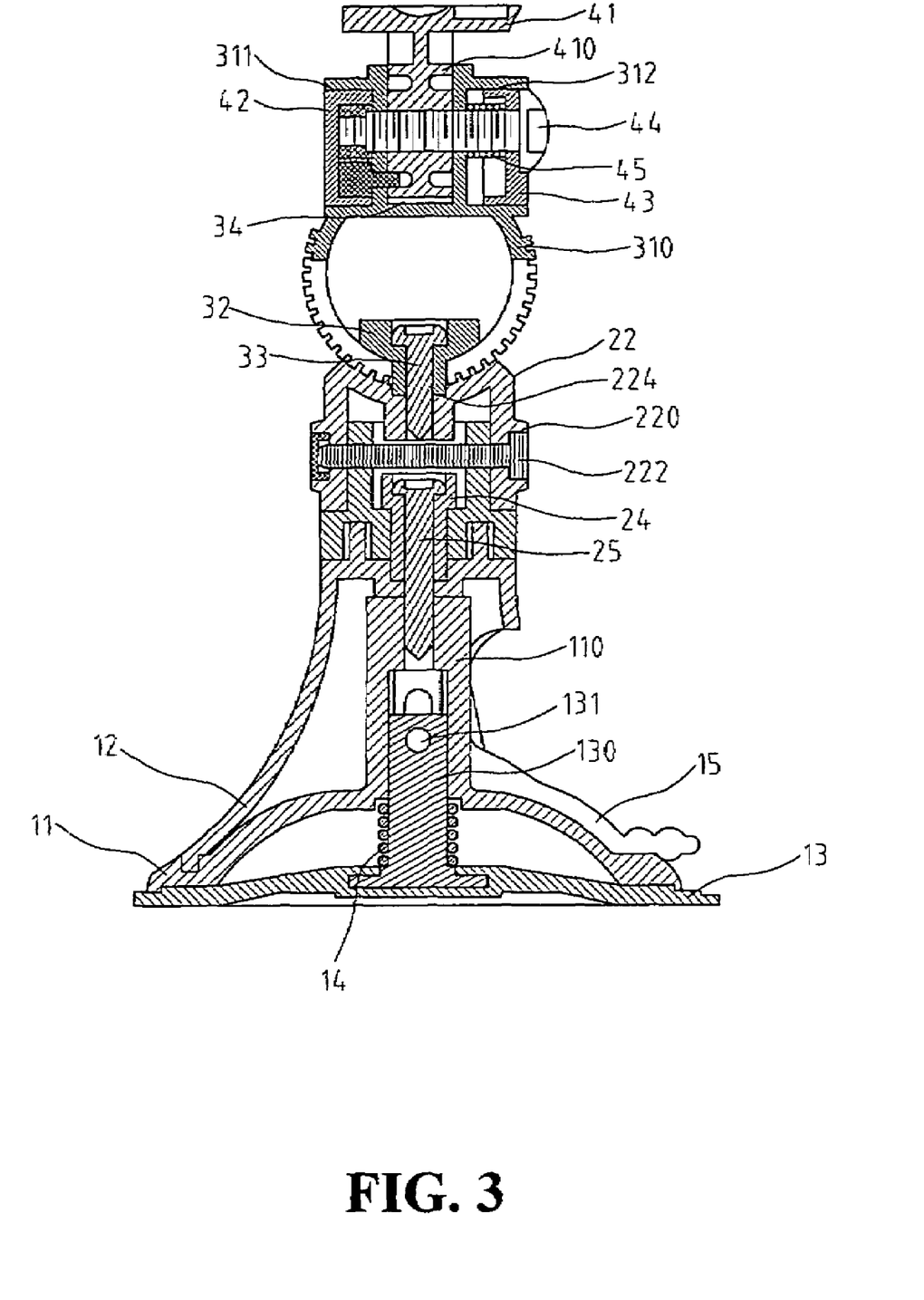
FIG. 3 is a front cross-sectional view showing the fixation device in accordance with the present invention.
Figure 4:
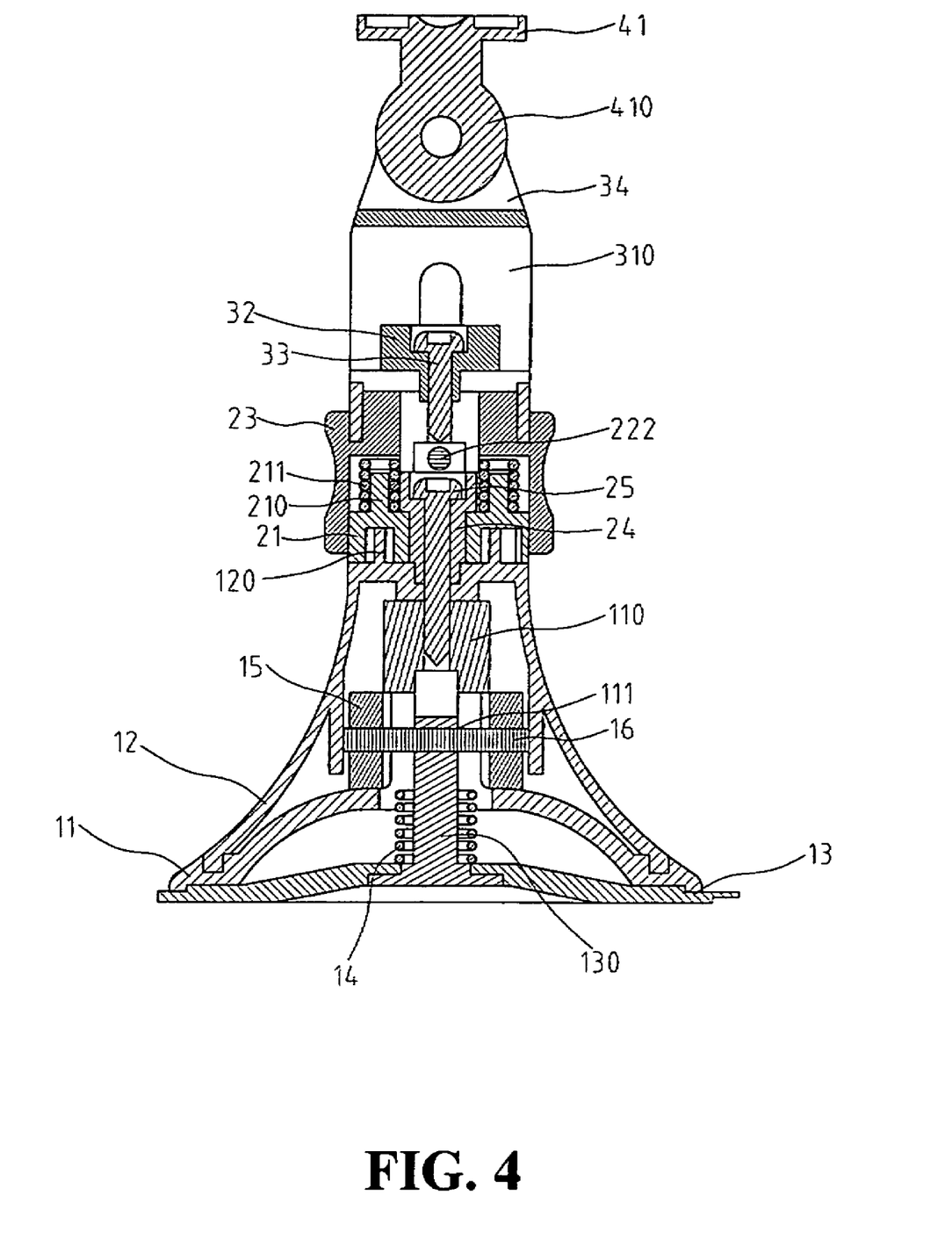
FIG. 4 is a side cross-sectional view showing the fixation device in accordance with the present invention.

With reference to FIGS. 2-4, the base assembly 10 comprises a base 11 with a hollow supporting column 110 disposed at the center thereof and having a column recess 111 on a sidewall of the supporting column 110. The base assembly 10 further comprises a base cap 12 having a base opening at a side surface and covering on the base 11. A first toothed portion 120 is provided on the top surface of the base cap 12 and arranged in circularly and horizontal. The base assembly 10 further comprises a suction disk 13 made of a tenacious material. The suction disk 13 is provided with a disk arm 130 extended upward at the center of the suction disk 13. Upper section of the disk arm 130 has a pinhole 131. A base spring 14 is installed around the disk arm 130. The base assembly 10 further comprises a positioning pin 16 and a locking tab 15 having two lugs 150. Each of the lugs 150 has a lughole 151 and a projection 152 under the lug 150. The disk arm 130 is installed into the supporting column 110 from the bottom of the base 11 through the base spring 14. The positioning pin 16 pivotally joints with the supporting column 110, the disk arm 130 and the locking tab 15 through the lugholes 151, the column recess 111 and the pinhole 131. When the suction disk 13 is placed on a plane surface and the locking tab 15 is flicked to a first position (flicked downward), the projections 152 is pressed on the base 11 and the disk arm 130 is raised upward by the lugs 150. Accordingly, the suction disk 13 is sucked on the plane surface due to the negative pressure between the bottom of the suction disk 13 and the plane surface. Otherwise, the projections 152 disengage from the base 11 when the locking tab 15 is flicked to the second position (flicked upward). The disk arm 130 moves downward by the lugs 150 to release the suction disk 13 from the plane surface.

The horizontal rotating assembly 20 of the present invention comprises a rotating base 21 with two stop member connecting parts 210, having two first elastic members 211 telescoped thereby. At least one elastic piece 26 is disposed on the bottom of the rotating base 21. The horizontal rotating assembly 20 connects to the base cap 12 by inserting a connecting screw 25 into a connecting bar 24, the rotating base 21 and then the top of the base cap 12. A rotating cap 22 comprises a cap opening 224 at the center, two cap recesses 221 and two cap holes 220, and connects with the rotating base 21 by a cap-fixing pin 222. Two stop members 23 are telescoped to the stop member connecting parts 210 on the rotating base 21 by passing through the cap recesses 221 of the rotating cap 22. The stop members 23 move along an axial direction of the rotating base 21.

The first angle adjusting assembly 30 comprises a first angle adjusting base 31 having a second angle adjusting assembly recess 34 on the top surface thereof, a second toothed portion 310 on the bottom surface thereof, and a cavity 311 and a cavity 312 disposed on the opposite side thereof. The teeth of the second toothed portion 310 are arranged in a direction parallel to a rotation axis of the first angle adjusting assembly 30. Two through holes 313 and 314 are arranged in the cavities 311 and 312 respectively. The first angle adjusting assembly 30 connects with the horizontal rotating assembly 20 by a connecting part 32 and a first screw 33.

The second angle adjusting assembly 40 of the present invention comprises a second angle adjusting base 41 having a third toothed portion 410 disposed circularly on both side surfaces thereof and connects with the second angle adjusting assembly recess 34 of the first angle adjusting assembly 30 by a second screw 44, a second elastic member 45, and positioning members 42 and 43.

Figure 5:
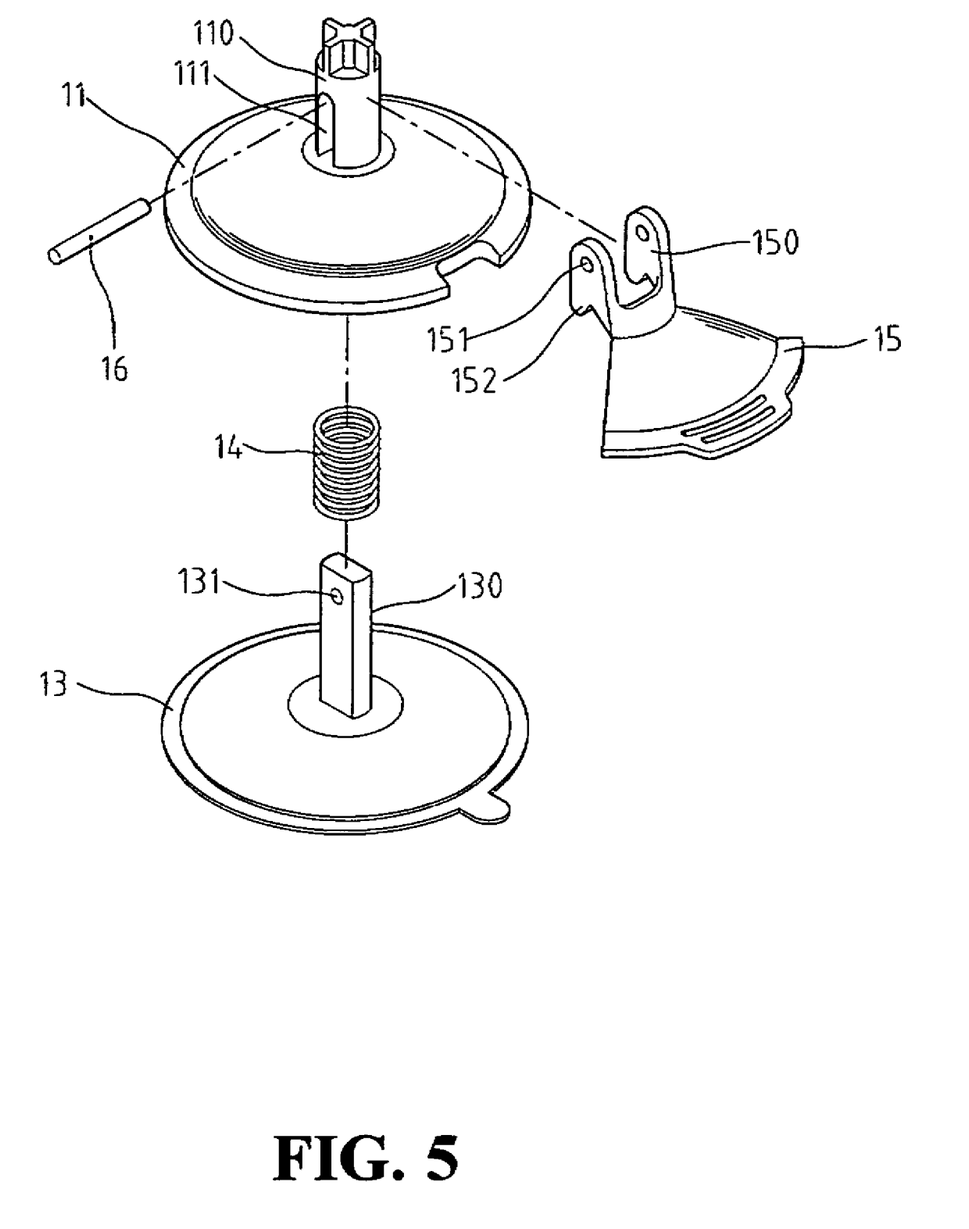
FIG. 5 is an exploded view of a base assembly of the fixation device in accordance with the present invention.
Figure 6A:
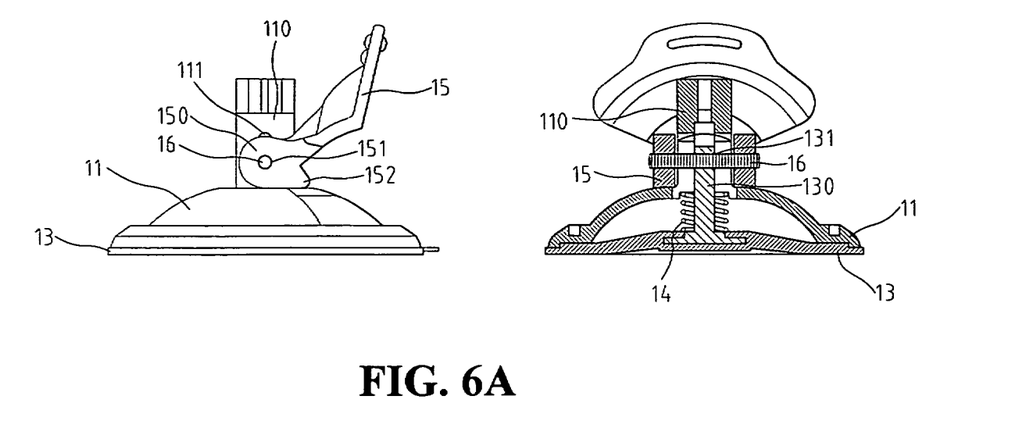
FIG. 6A is a side view and a front cross-sectional view showing the base assembly of the fixation device in an initial condition in accordance with the present invention.
Figure 6B:
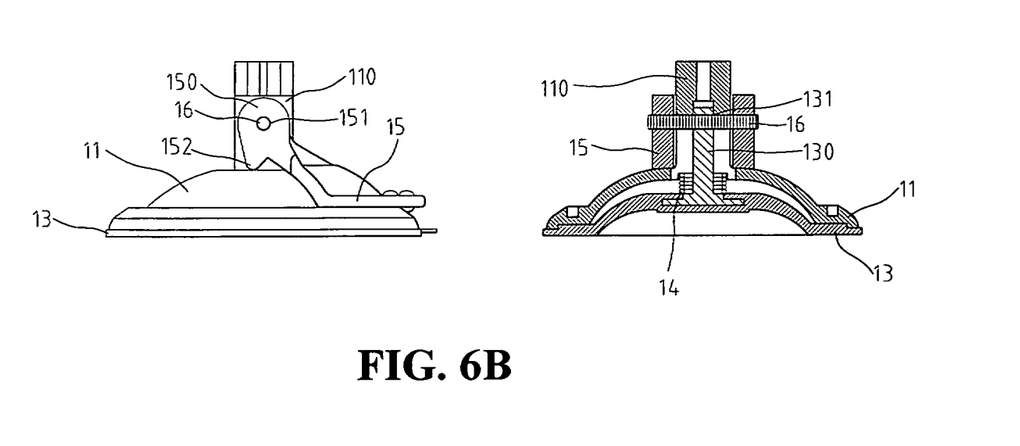
FIG. 6B is side view and a front cross-sectional view of the base assembly of the fixation device in an operational condition in accordance with the present invention.

As show in FIG. 5, the positioning pin 16 connects the suction disk 13, the base 11 and the locking tab 15 by passing through the lugholes 151 of the locking tab 15, the column recess 111 on the supporting column 110 and the pin hole 131 on the disk arm 130. The suction disk 13 is in contact with the ground when the locking tab 15 is in the second position (as show in FIG. 6A). The suction disk 13 is disengaged from the surface plane. When the locking tab 15 is pressed to the first position (as show in FIG. 6B), the projections 152 are pressed on the base 11, the positioning pin 16 drives the disk arm 130 upward, and the disk arm 130 pull the center of the suction disk 13 upward. There is a negative pressure between the suction disk 13 and the plane surface. Thus the fixation device sucks on the plane surface.

Figure 7A:
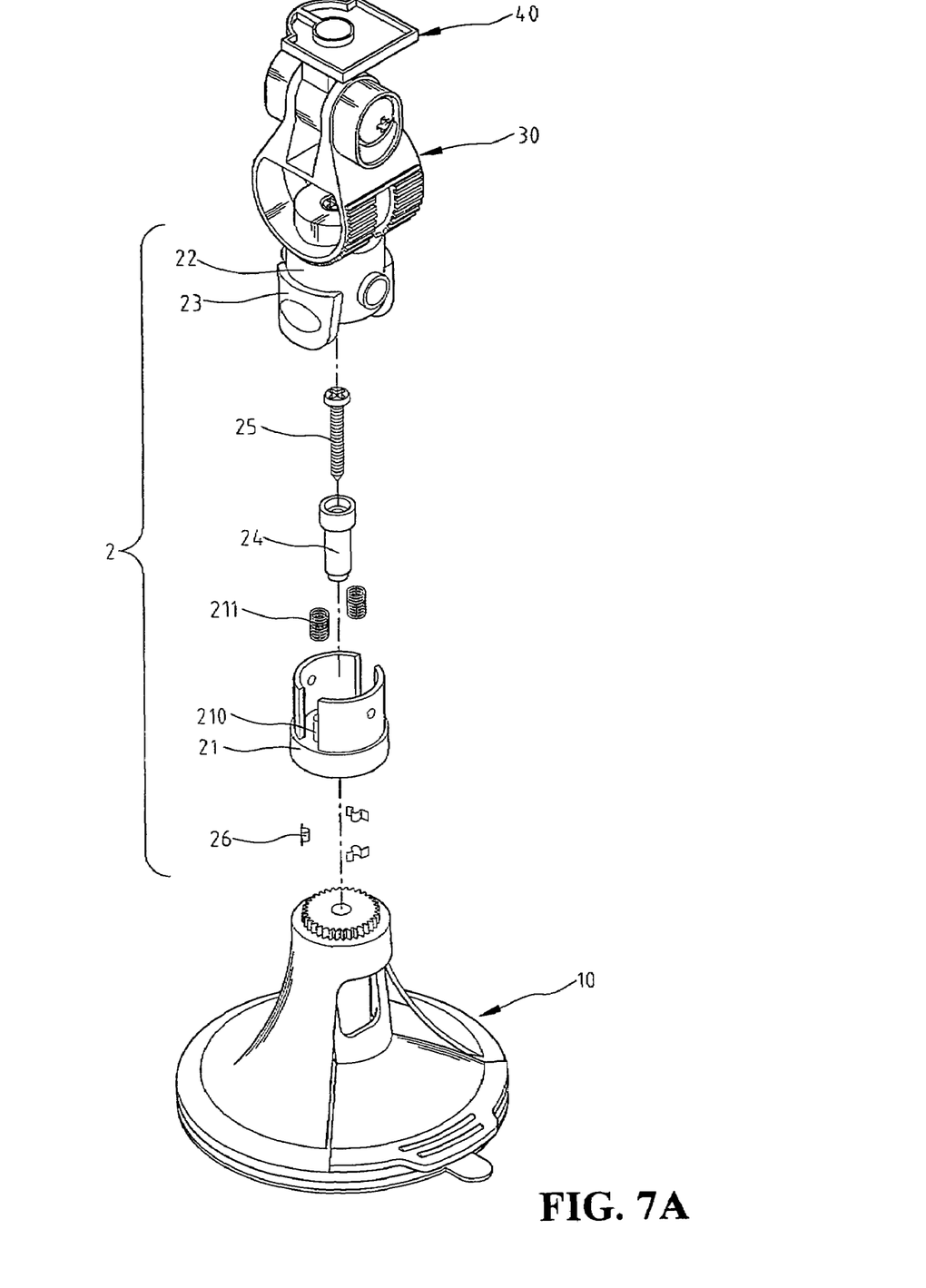
FIG. 7A is an exploded view showing a horizontal rotating assembly in accordance with the present invention.
Figure 7B:
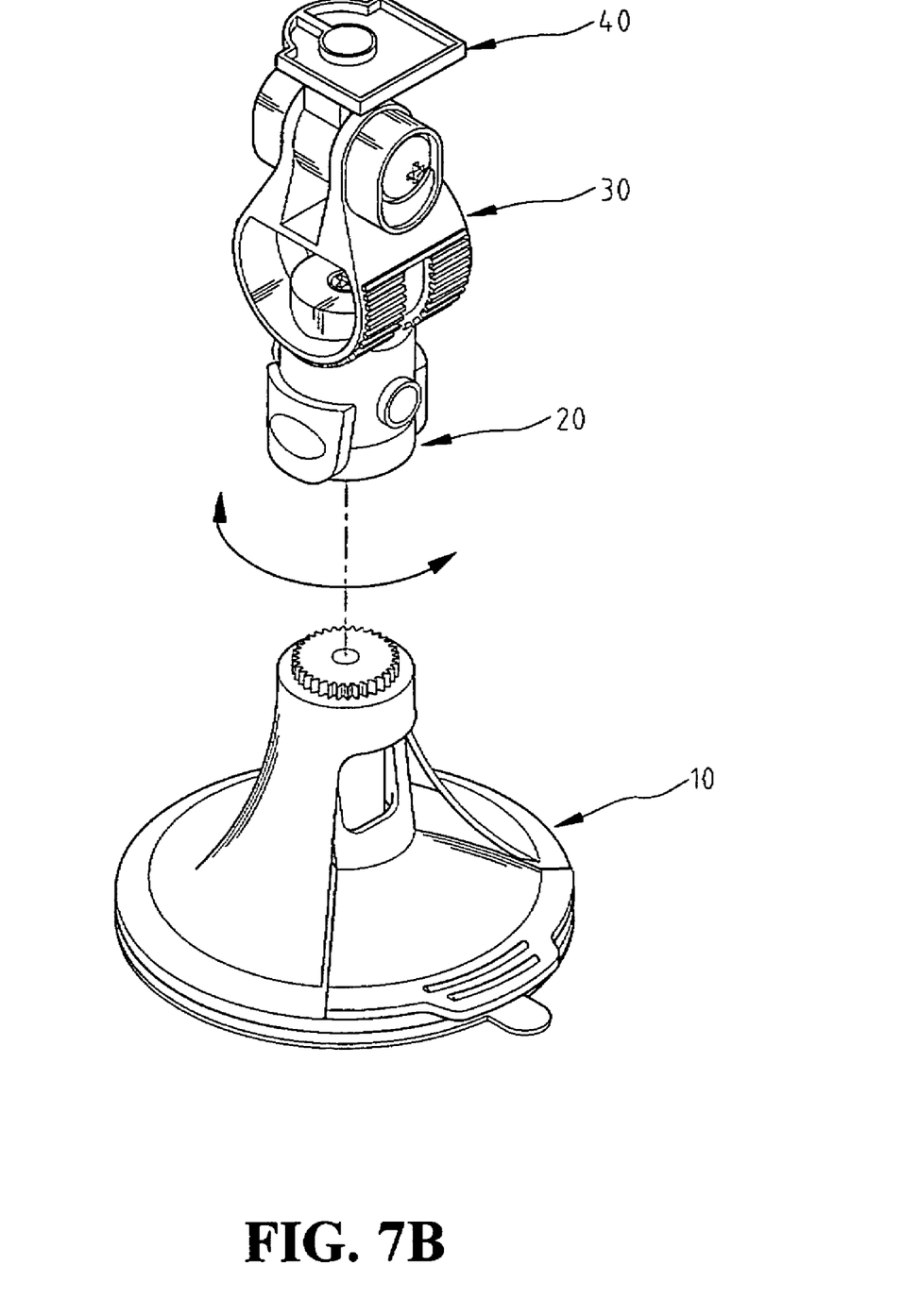
FIG. 7B is a schematic view showing a rotating direction of the horizontal rotating assembly in accordance with the present invention.
Figure 8:
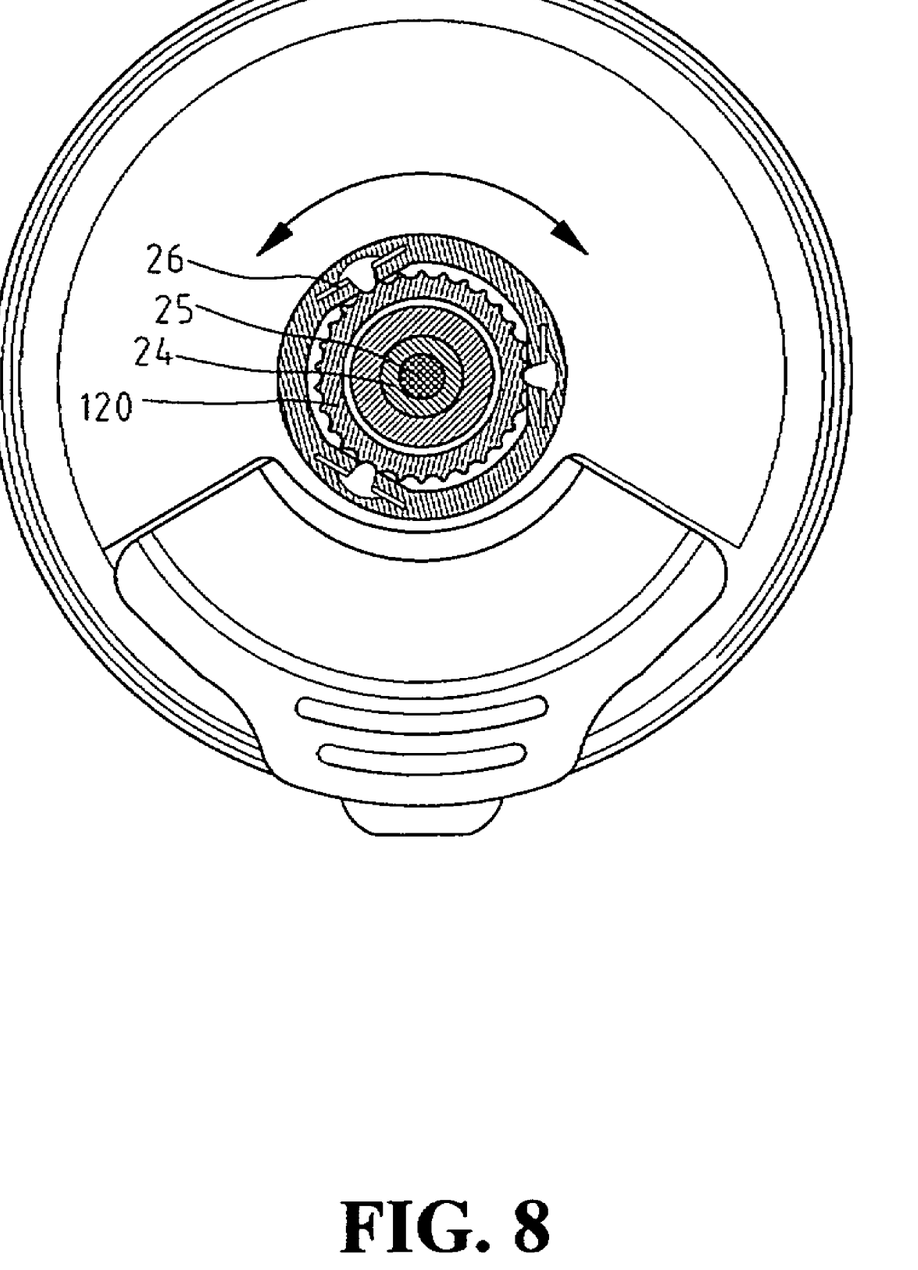
FIG. 8 is a top cross-sectional view showing the horizontal rotating assembly of the fixation device in accordance with the present invention.

As shown in FIG. 7A, the rotating base 21 connects to the base assembly 10 by the connecting bar 24 and the connecting screw 25. As shown in FIGS. 7B and 8, the horizontal rotating assembly 20 is rotatable along the central axis of the base assembly 10 after the rotating base 21 connects to the base assembly 10. The elastic pieces 26 and the first toothed portion 120 are engaged thereby ensuring the horizontal rotating assembly 20 stops at the desired position.

Figure 9:
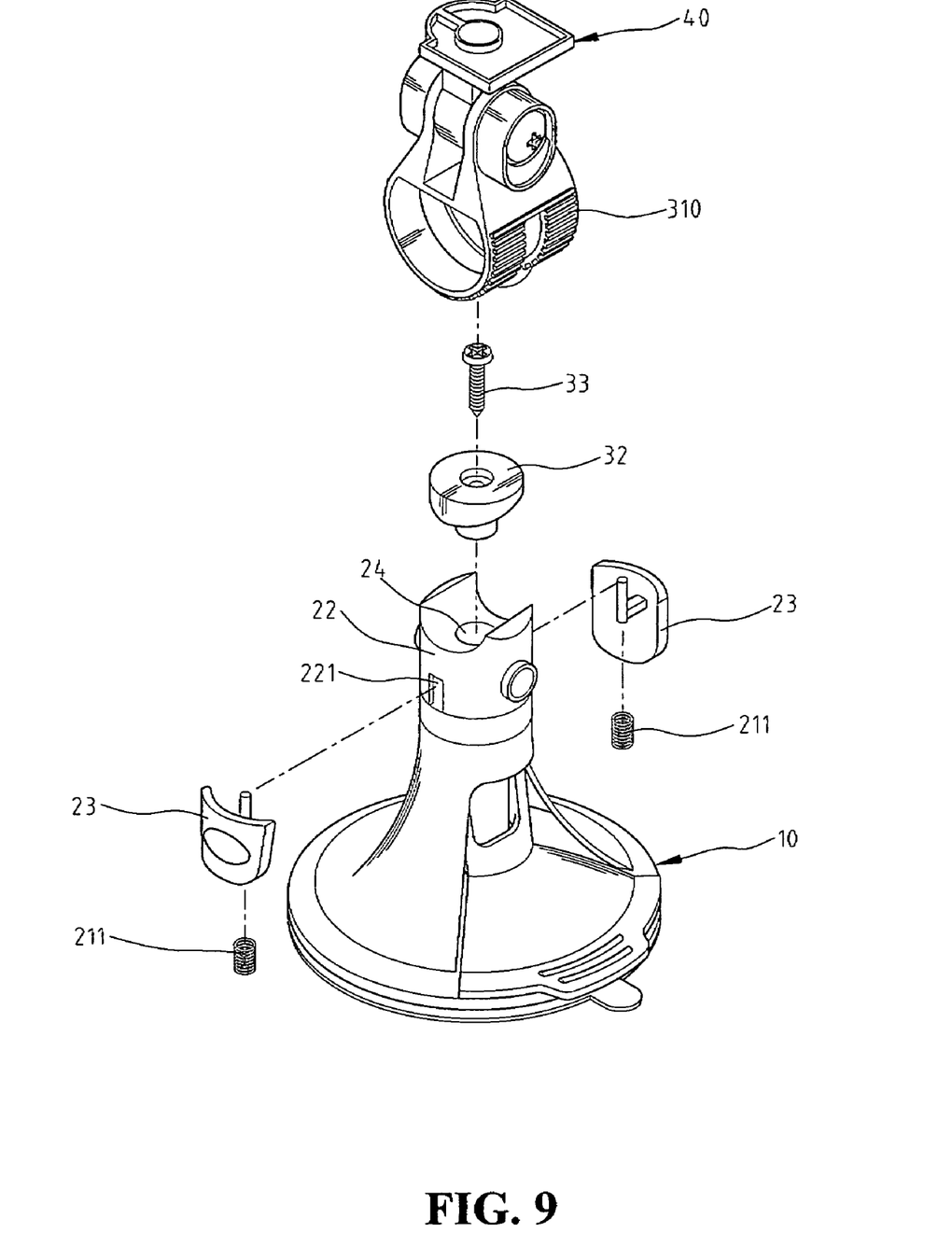
FIG. 9 is an exploded view showing a connecting part and stop members of the fixation device in accordance with the present invention.
Figure 10A:
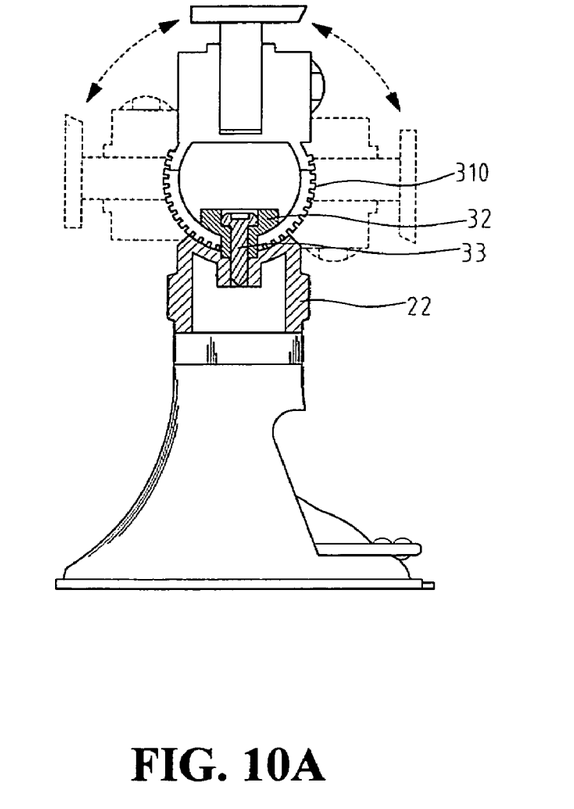
FIG. 10A is a schematic view showing a first angle adjusting assembly in rotating condition in accordance with the present invention.
Figure 10B:
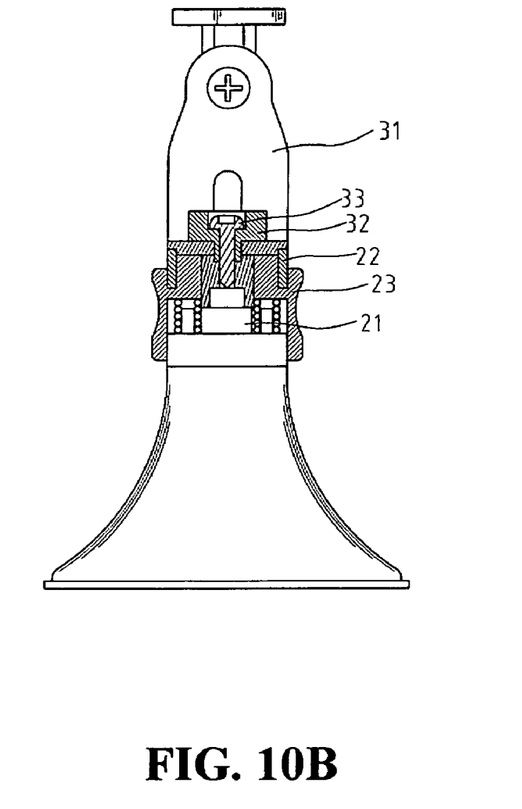
FIG. 10B is a side cross-sectional view showing the first angle adjusting assembly in accordance with the present invention.

As shown in FIG. 9, the first angle adjusting assembly 30 connects with the horizontal adjusting assembly 20 by the connecting part 32 and the first screw 33. The stop members 23 are disposed at a lateral surface of the horizontal rotating assembly 20. The stop members 23 move along the axial direction of the rotating base 21 and are pushed back to an initial position by the first elastic members 211 when they are released. As shown in FIGS. 10A and 10B, the second toothed portion 310 disengages from the stop members 23 when the stop members 23 move downward to leave the initial position. Therefore, the angle of the first angle adjusting assembly 30 is adjustable. The stop members 23 engage with the second toothed portion 310 of the first angle adjusting base 31 when the first elastic members 211 push the stop member 23 back to the initial position. Thus, the angle of the first angle adjusting assembly 30 is fixed. Lower part of the first angle adjusting assembly 30 is a cylindrical structure. A cylindrical axis is the rotation axis of the first angle adjusting assembly 30 and is perpendicular to the central axis of the base assembly 10.

Figure 11:
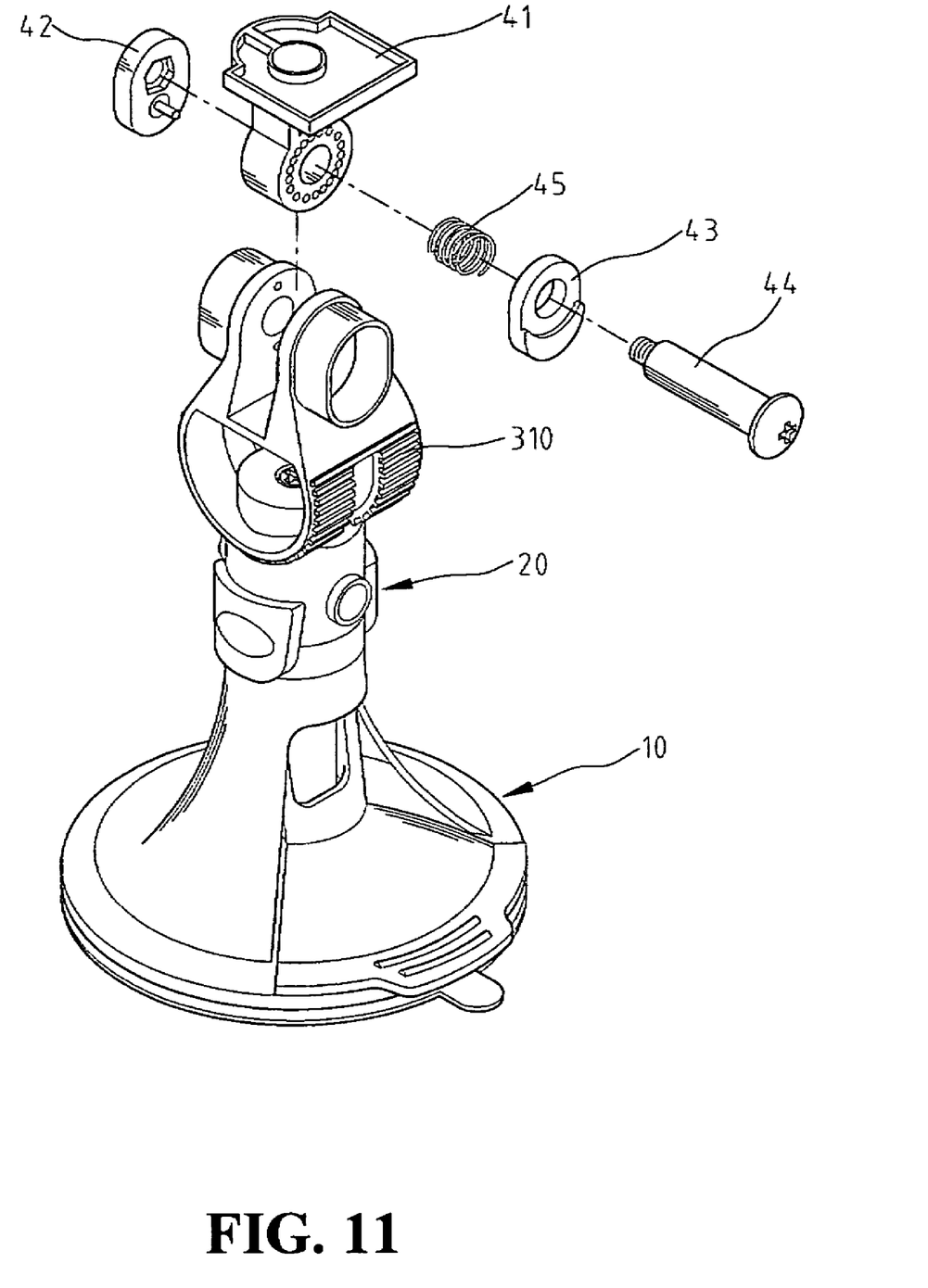
FIG. 11 is an exploded view showing a positioning member and a second crew of a second adjusting assembly in accordance with the present invention.
Figure 12A:
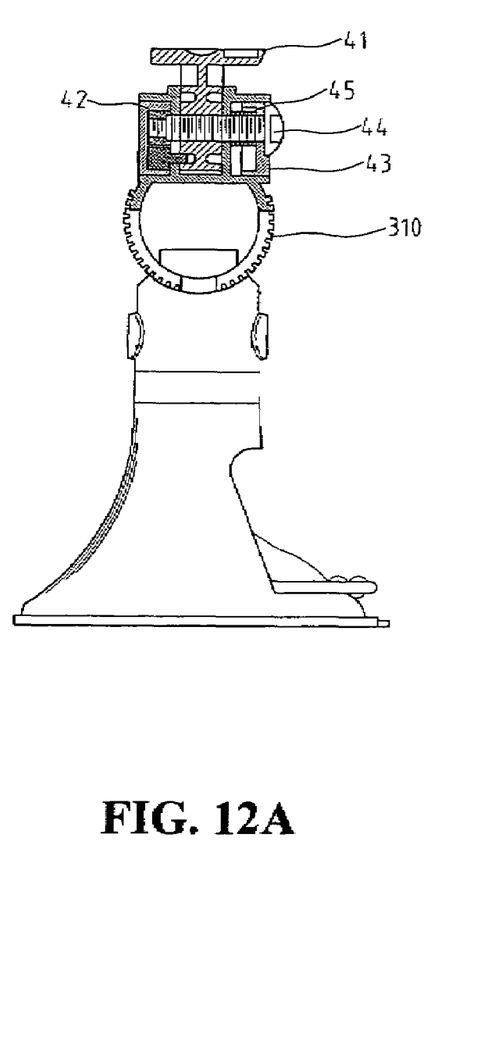
FIG. 12A is a side cross-sectional view showing the second angle adjusting assembly in accordance with the present invention.
Figure 12B:
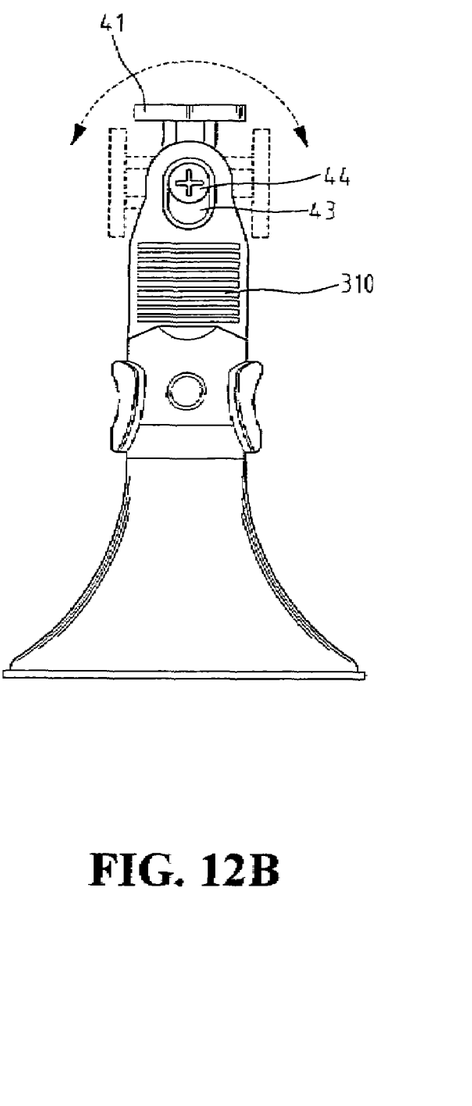
FIG. 12B is a front view showing the second angle adjusting assembly in rotating condition in accordance with the present invention.

As shown in FIGS. 11, 12A and 12B, the second angle adjusting base 41 of the second angle adjusting assembly 40 is disposed in the second angle adjusting assembly recess 34 of the first angle adjusting assembly 30 by the second screw 44, the second elastic member 45 and the positioning members 42 and 43. The positioning member 42 moves outward with the second screw 44 when the positioning member 43 is pressed. The position member 42 disengages from the third toothed portion 410. Therefore, the second angle adjusting assembly 40 is free to rotate as shown in FIG. 12B. The positioning member 42 is pushed back to its initial position and engaged with the third toothed portion 410 by the second elastic member 45 when the positioning member 43 is released. Lower part of the second angle adjusting assembly 40 is a cylindrical structure. A cylindrical axis is the rotation axis of the second angle adjusting assembly 40 and is perpendicular to the rotation axis of the first angle adjusting assembly 30.

As mentioned, the fixation device described above with the communication equipments installed on the second angle adjusting assembly 40 is sucked on a surface by the suction disk 11 of the base assembly 10. The rotation of the horizontal rotating assembly 20, the first angle adjusting assembly 30 and the second angle adjusting assembly 40 achieves the purposes for user's ergonomics, habits and the convenient operation.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A fixation device comprising
    a base assembly comprising a suction disk and a base;
    a horizontal rotating assembly pivoted to the base assembly and rotating pivotally along a central axis of the base assembly;
    a first angle adjusting assembly pivoted to the horizontal rotating assembly and rotating pivotally along an axis perpendicular to the central axis of the base assembly; and
    a second angle adjusting assembly pivoted to the first angle adjusting assembly and rotating pivotally along an axis perpendicular to the rotation axis of the first angle adjusting assembly;
    wherein the suction disk has a disk arm extending upward and the base has a supporting column extending upward; the disk arm is telescoped into a base spring and then the supporting column from the bottom of the base; the supporting column and disk arm pivotally joint with a locking tab; an end of the locking tab has a projection; a center of the suction disk raises up a predetermined distance by pressing the projection on the base when the locking tab rotates to a first position; and the suction disk moves back to an initial position by disengaging the projection from the base when the locking tab rotates to a second position; and
    wherein a top surface of the base assembly comprises a first toothed portion and the horizontal rotating assembly comprises at least one elastic piece engaging with the first toothed portion when the horizontal rotating assembly is connected with the base assembly by a connecting bar and a connecting screw.

2. The fixation device as claimed in claim 1, wherein the horizontal rotating assembly comprises two stop members respectively disposed at two opposite sides thereof and moved vertically, a first elastic member fits into each stop member, and the stop members are pushed back to the initial position by the first elastic members.

3. The fixation device as claimed in claim 1, wherein the first angle adjusting assembly connects with the horizontal rotating assembly by a connecting part and a first screw.

4. The fixation device as claimed in claim 2, wherein the first angle adjusting assembly comprises a second toothed portion engaging with the stop members when the first angle adjusting assembly connects with the horizontal rotating assembly.

5. The fixation device as claimed in claim 1, wherein the second angle adjusting assembly comprises a third toothed portion connected to the first angle adjusting assembly by a second screw, a second elastic member and a positioning member, the second angle adjusting assembly is fixed in place when the positioning member engages with the third toothed portion, and the second angle adjusting assembly is pivotally rotatable along an axis perpendicular to the rotation axis of the first angle adjusting assembly when the positioning member disengages from the third toothed portion.

6. The fixation device as claimed in claim 1, wherein the suction disk is made of a tenacious material.

* * * * *